Dec. 17, 1957 M. OSTHAUS 2,816,499
ROTARY TILLING IMPLEMENT
Filed June 1, 1955

INVENTOR
MANFRED OSTHAUS
BY Ernest G. Montague
ATTORNEY

United States Patent Office 2,816,499
Patented Dec. 17, 1957

2,816,499

ROTARY TILLING IMPLEMENT

Manfred Osthaus, Rotenburg, Hannover, Germany

Application June 1, 1955, Serial No. 512,446

Claims priority, application Germany July 27, 1954

2 Claims. (Cl. 97—216)

The present invention relates to a rotary tilling implement, and more particularly to a novel means of mounting the tilling tools normally used in such implements. In the past rotary tilling devices have been developed in which the tilling tools, as for instance tines, are fixed on the outside of a rotary carrier which is connected to a suitable drive unit. The tines have been arranged on a common torsional spring concentrically enclosing the drive shaft, said torsional spring being subjected to the strain from all of the tines. Mounting of the tines on the outside of the carrier means, however, is not favorable in so far as the tines tend to break off when encountering an obstacle since they cannot give or bend, although they spring back to their initial position after such obstacle has been passed. Furthermore, it has already been proposed to mount a plurality of tines in rubber torsional springs arranged around the drive shaft and spaced equally from said shaft. It has been found that such mounting does not prevent damage to the tools, since no limiting means are provided against bending of the tool, if an obstacle is encountered.

It is, therefore, one object of the present invention to provide a rotary tilling implement in which a plurality of annular carrier means or annular segments forming such carrier means or rings, are arranged side by side on a shaft, the inner circumference of said carrier means being provided with resiliently mounted individual tines so that the ends entering the soil extend over the outer circumference of the rings, whereby the tines and their mountings are protected by the carrier means or the segments, respectively, and each tine can grip only as much soil as is desired, and the outer face of said rings functioning as limiting or abutment means for the bending of the tines on their resilient mounting, if an obstacle is encountered.

It is another object of the present invention to provide a rotary tilling implement, comprising a plurality of carrier means or ring members mounted in adjacent arrangement on a shaft and in which each tine is mounted in a separate spring body made of rubber, steel, or any other elastic material, particularly forming a torsional spring. Such elastic bodies are arranged on the inner circumference of the carrier means and eccentric to the shaft. Only the operative ends of the tines project over the outer circumference of the associated carrier member. Any number of tines may be provided on the inner circumference of the ring. At its outer end each tine is bent toward the carrier so that in case of excessive straining the curved end of the tine may engage or abut the outside face of the carrier, whereby over-straining of the associated spring body is avoided.

Together with the replaceable tines mounted on the carrier means, each carrier forms a unit. Several of such units are mounted on the shaft, according to the width desired, and form a tilling roller.

It is still another object of the present invention to provide a rotary tilling implement comprising a plurality of carrier means or ring members mounted in adjacent arrangement on a shaft and in which each of the tines is mounted in a separate resilient body, and in which the torsional spring body preferably used for mounting the tines substantially comprises an inner bushing and a pair of shells enclosing said inner bushing at a predetermined distance, said shells having flanges for securing to brackets fixed to the inner circumference of said ring members and an intermediate rubber layer is bonded to the bushing and the shells.

With these and other objects in view, which will become apparent in the following detailed description, the present invention will be clearly understood in connection with the accompanying drawings, in which.

Figure 1:
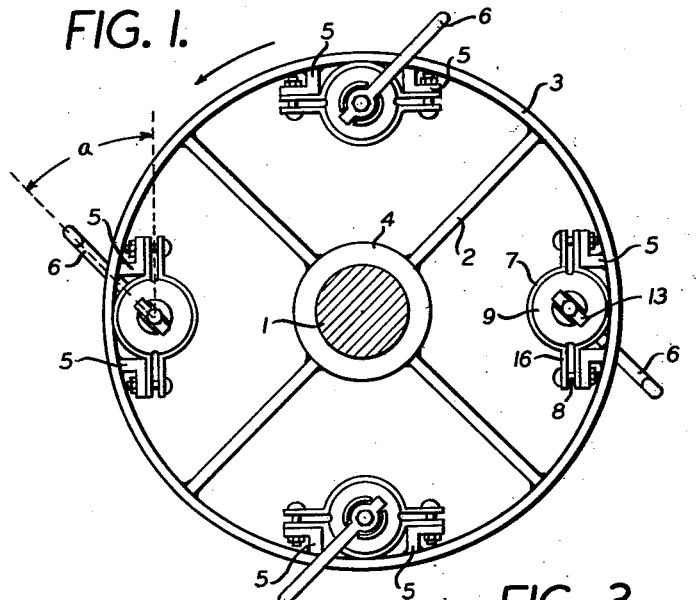
Fig. 1 is a side elevation of the tilling roller.
Figure 2:
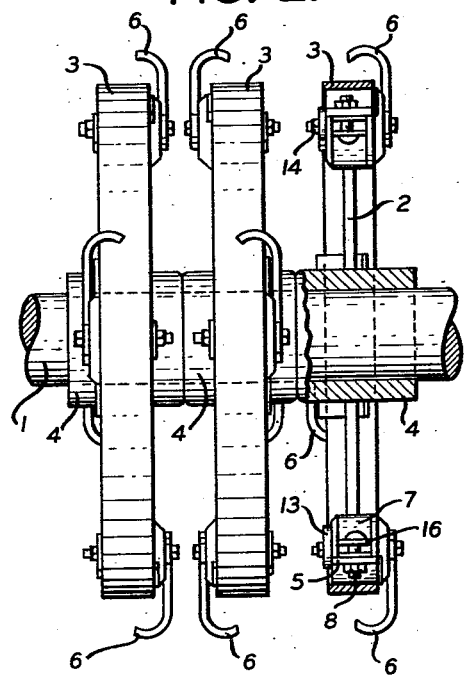
Fig. 2 is a top plan view of three of the annular carrier means forming the tilling roller, one of said carrier means being shown in section.
Figure 3:
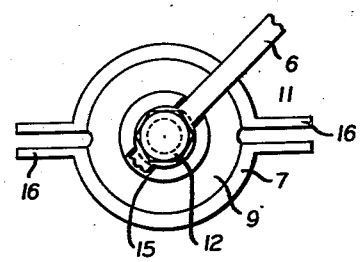
Fig. 3 is a side elevation of a tine mounting on an enlarged scale.
Figure 4:
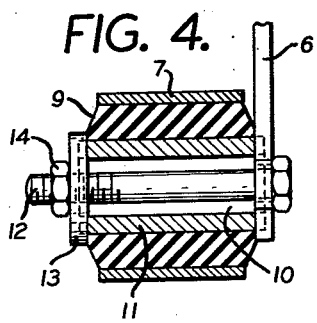
Fig. 4 is a sectional view through the tine mounting with respect to Fig. 3.

Referring now to the drawing, a plurality of annular carrier means, which may comprise several segments, are arranged side by side on a shaft 1, carrying the individual tines 6. The space between each pair of adjacent rings 3 is defined by the width of the hubs 4, while the required width of the implement itself determines the number of the rings 3. The rings 3 are connected to their hubs 4 through means of spikes 2. On their inner circumference the rings 3 are provided with brackets 5 which receive the tines 6.

Each tine 6 is fixed to a resilient body comprising a pair of shells 7, a bushing 11, and a rubber body 9 bonded to the shells and the bushing. The shells 7 have flanges 16 spaced from each other for mounting to the brackets 5. Through means of a bolt 8 extending through the flanges 16 and the brackets 5 the resilient bodies with the tines 6 are fixed on the inner circumference of the rings 3. The elasticity of the rubber torsional spring 9 is adjusted by placing spacers 16' between the flanges 16.

The bushing 11 of each resilient body extends for a certain amount over the rubber body 9 on both sides and is provided with a slot or recess 15 into which the tine 6 fits with its shank, thus providing a safeguard against over-turning the tine with respect to the resilient body. The recesses 15 in the bushings 11 are arranged symmetrically on both sides so that the tine may be fixed on either side of the ring 3. The mounting itself is brought about by means of a bolt 12 extending through the tine shank and the bushing 11. The bolt 12 is secured by means of a nut 14 screwed against a counter plate 13.

The tine 6 is disposed at an angle $a$ with respect to the carrier, i. e. in the direction of rotation. The tines 6 are inclined backwards so that the curved outer ends can rest against the outer circumference of the rings 3 when an obstacle is encountered which eliminates the danger of subjecting the rubber body 9 to excessive strain.

Any number of tines 6 may be provided on the circumference of the rings 3. Preferably they extend alternately over the circumference of the rings 3 on the right and left side. Several variations are possible by reversing the tine mounting in the resilient body.

The roller formed by the rings 3 is journalled in a frame (not shown), and is rotated by drive means (not shown), since these elements do not form part of the present invention.

While I have disclosed one embodiment of the present invention, it is to be understood that this embodiment is given by example only and not in a limiting sense, the scope of the present invention being determined by the objects and the claims.

I claim:

1. In a rotary tilling implement, a shaft, a plurality of carrier means mounted on said shaft in adjacent arrangement, each of said carrier means comprising a ring member, a plurality of resilient bodies secured to and spaced apart angularly on the inner face of said ring member, a tine resiliently mounted in each of said resilient bodies and extending beyond the outer circumference of said ring member, the outer end of said tine being turned within a zone defined by the planes formed by the side faces of said ring member and the circumferential outer face of said ring member, so that upon encountering an obstacle said tine will be turned against the force exerted by said resilient body into engagement of its outer end with the circumferential outer face of the ring member, said ring member operating as depth gauge means as well as limiting deflecting means for said tine, said carrier means being mounted on said shaft by means of hubs of a width greater than that of said ring members, so that the width of said hubs determines the spacing between each pair of adjacent ring members and each of said ring members having a plurality of brackets secured to the inner face of said ring members, and said resilient bodies comprising a pair of shells having flanges projecting therefrom, said flanges being adapted to secure said shells to said brackets, a bushing disposed coaxially inside of said shells and an annular body of resilient material disposed between and bonded to said shells and said bushing, and means for securing a tine to said bushing.

2. The tilling implement, as set forth in claim 1, in which said means for securing a tine to said bushing comprises a bolt extending through said bushing and the latter having at both ends a radially disposed slot adapted to receive the shank of said tine, the latter secured to either side of said bushing by means of said bolt.

References Cited in the file of this patent

UNITED STATES PATENTS

| | | |
|---|---|---|
| 2,054,129 | Kelsey | Sept. 15, 1936 |
| 2,603,139 | Johnson | July 15, 1952 |